Sept. 23, 1958 W. S. CAMPBELL 2,853,604

WAVE FILTERS

Filed Jan. 6, 1954 3 Sheets-Sheet 1

INVENTOR.
WILLIS S. CAMPBELL
BY George Sipkin
B. L. Zangwill
ATTORNEYS

INVENTOR.
WILLIS S. CAMPBELL
BY George Sipkin
B. L. Zangwill
ATTORNEYS

Sept. 23, 1958 W. S. CAMPBELL 2,853,604

WAVE FILTERS

Filed Jan. 6, 1954 3 Sheets-Sheet 3

INVENTOR.
WILLIS S. CAMPBELL
BY George Sipkin
B. L. Zangwill
ATTORNEYS

United States Patent Office 2,853,604
Patented Sept. 23, 1958

2,853,604

WAVE FILTERS

Willis S. Campbell, Damascus, Md.

Application January 6, 1954, Serial No. 402,611

11 Claims. (Cl. 250—27)

(Granted under Title 35, U. S. Code (1952), sec. 266)

The invention described herein may be manufactured and used by or for the Government of the United States of America for governmental purposes without the payment of any royalties thereon or therefor.

The present invention relates to improved wave filter circuits.

Prior art arrangements for this purpose include simple R-C filter circuits, conventional L-C filters of the constant K or M derived types and mechanical type filters. These prior art filters all are subject to disadvantages particularly when filtering of very low frequencies is desired. A simple R-C filter has a very gradual cut off characteristic and tends to have excessive phase shift within the pass band. Conventional L-C filters require prohibitively large inductors and capacitors when used at very low frequencies. Mechanical filters are extremely inflexible and require conversion equipment to change the form of the electrical signal.

Basically the present invention may be said to relate to an improved filter of the R-C type wherein the effective value of at least one group of circuit elements is caused to shift as a function of the applied frequency in order to provide improved response characteristics.

The R-C circuit possesses the advantage of simplicity and by use of the present invention may be made to exhibit vastly improved response characteristics. A steep slope cut-off response curve may be obtained and the damping of the circuit may be made adjustable. The termination of a filter constructed in accordance with the present invention has substantially no effect on the filter operation. These advantages are achieved by varying the R component of the R-C filter as a function of the applied frequency. The improved filters resulting are capable of use at very low frequencies where ordinary filter design becomes difficult if not impossible.

An object of the present invention is to provide a practical means of filtering electrical signals of very low frequencies.

A further object of the invention is to provide filter circuits having relatively steep cut-off characteristics.

A still further object of the invention is to provide electrical filters having adjustable damping means.

Still another object of the invention is to provide improved filter circuits of the high-pass, low-pass and band-pass types.

Other objects and many of the attendant advantages of this invention will be readily appreciated as the same becomes better understood by reference to the following detailed description when considered in connection with the accompanying drawings wherein:

Fig. 1 illustrates a high-pass filter circuit constructed in accordance with the principles of the invention. This high-pass filter circuit is designed to pass all frequencies above the cut-off frequency and exhibit an attenuation characteristic of approximately 21 db per octave below the cut-off frequency.

Figure 1:
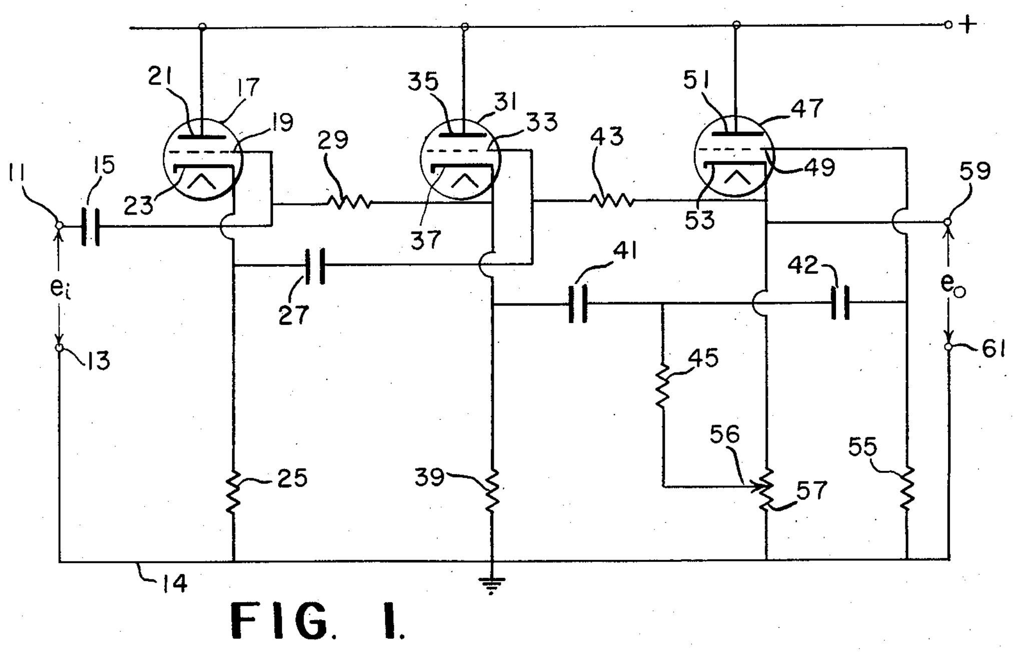
Fig. 1 is a schematic drawing of one form of a circuit according to the invention.

Specifically the apparatus of Fig. 1 consists of a pair of input terminals 11 and 13 adapted to be connected to a source of alternating voltage $e_1$ to be acted upon by the filter. Input terminal 11 is coupled through a condenser 15 to the grid 19 of an electron discharge tube 17. Input terminal 13 is connected to a ground bus 14. The plate 21 of tube 17 is connected to a positive bus which in turn is connected to the positive terminal of a high-voltage source (not shown). The negative terminal of the high voltage source is connected to the ground bus 14. Cathode 23 of the tube is connected to ground bus through cathode resistor 25.

It will be noted that tube 17 is connected in a cathode follower circuit. The output of this cathode follower circuit is coupled through condenser 27 to grid 33 of tube 31. The circuit of tube 31 is similar to that of tube 17 with plate 35 tied to the positive bus and cathode 37 connected to the ground bus through resistor 38. Cathode 37 is also connected to the grid 19 of tube 17 through resistor 29.

The output of the cathode follower stage 31 is coupled through a cascaded R-C network consisting of condensers 41 and 42 and resistors 45 and 55 to grid 49 of tube 47. Resistor 45 is connected at its lower end to an adjustable tap 56 on cathode resistor 57 of the tube 47. The purpose of the adjustable tap will be hereinafter described. The output of cathode follower stage including tube 47 is connected to the grid 33 of tube 31 through resistor 43. The cathode of tube 47 is also connected to an output terminal 59 and a second output terminal 61 is connected to the ground bus 14.

The system of Fig. 1 as described above comprises a filter having four R-C circuits three of which are isolated by cathode follower circuits. Positive feedback is applied to two of the cathode follower stages from the next succeeding stage and positive feedback is applied to the third stage from its own circuit. The operation of the circuit will now be described.

The input voltage fed to terminals 11 and 13 is applied to an R-C circuit made up of condenser 15, resistor 29 and cathode resistor 39. This R-C circuit can be designated as a frequency responsive circuit or filter having the resistor 29 as the shunt impedance thereof. This circuit is designed with a time constant determined by the desired cut-off frequency of the filter. It is well known that as the time constant, 1/RC, of such a circuit becomes shorter with respect to the period of the input wave the voltage across the condenser becomes more nearly equal to the input voltage and the voltage across the resistor decreases correspondingly. The R-C circuit is thus frequency responsive. The voltage across resistors 29 and 39, varying in inverse relation with respect to the frequency of the input voltage as explained above, is applied to the grid 19 of the cathode follower tube 17. The voltage output of cathode follower tube 17, developed across cathode resistor 25 is coupled through a second R-C circuit made up of condenser 27, and resistors 43 and 57 to the grid 33 of cathode follower tube 31. This second R-C circuit has the same time constant as the first circuit and is similarly frequency responsive. The second cathode follower tube 31 develops an output voltage across its cathode resistor 39.

The output voltage of the second cathode follower stage is in turn coupled forward through the condenser 41 and its associated network, later to be described in detail, to the grid of the third cathode follower tube 47. It is important to note, however, that the output voltage of the second cathode follower tube is also coupled back through resistor 29 in a positive feedback connection to the grid 19 of the first cathode follower tube 17. The effect of this positive feedback action is to further modify the R portion of the first R-C circuit as a function of the frequency of the input voltage. The effect is cumulative and the slope of the frequency cut-off curve is increased and results in an almost constant slope throughout the attenuated frequency band.

The same positive feedback action takes place between the second and third cathode follower stages. The output voltage of the second stage developed across resistor 39 is coupled to the grid 49 of the third tube 47 through the R-C network including condensers 41 and 42 and resistors 45, 57 and 55. It will be apparent that this network is made up of a pair of cascaded R-C circuits made up primarily of condenser 41 and resistance 45 followed by condenser 42 and resistance 55. The output voltage developed across cathode resistor 57 is coupled forward circuitwise to output terminal 59 and backward in a positive feedback connection through resistor 43 to the grid 33 of the second cathode follower stage. The same cumulative frequency responsive effect described in connection with the first and second cathode follower stages takes place.

A further positive feedback connection is introduced in the cascaded R-C network connection. Resistor 45 is connected at its lower end to an adjustable tap 56 on cathode resistor 57 of the final cathode follower tube. A variable portion of the cathode follower output voltage is thus coupled by way of resistance 45 and the R-C circuit made up of condenser 42 and resistance 55 to the grid 49 of the tube 47. This constitutes positive feedback of the output of the third cathode follower circuit to its own input. Since the amount of feedback used here is adjustable it can be used to change the gain of the final cathode follower stage. This, of course, because of the previously described feedback connections will have an effect on the operation of the entire circuit. The purpose of this gain changing circuit will be described later in connection with the description of the response curve of the system shown in Fig. 2.

The above described circuit may be made operative at any desired frequency by a proper choice of the R-C constants used in the circuit consequently, the cutoff frequency may be selected. Variable R or C elements may be used to obtain an adjustable filter. A typical example of an actual circuit utilizing the principles of the invention will be given. A high-pass filter having a cut-off frequency of 2 cycles per second has been constructed using the following components:

| | | |
|---|---|---|
| Tubes: | | |
| | 17 | 1/2 6SN7 |
| | 31 | |
| | 47 | |
| Condensers: | | |
| | 15 | 0.5 microfarad |
| | 27 | |
| | 41 | |
| | 43 | |
| Resistors: | | |
| | 29 | 200,000 ohms |
| | 43 | |
| | 45 | |
| | 55 | |
| | 25 | 10,000 ohms |
| | 39 | |
| | 57 | |
| High voltage source | | 200 volts |

Figure 2:
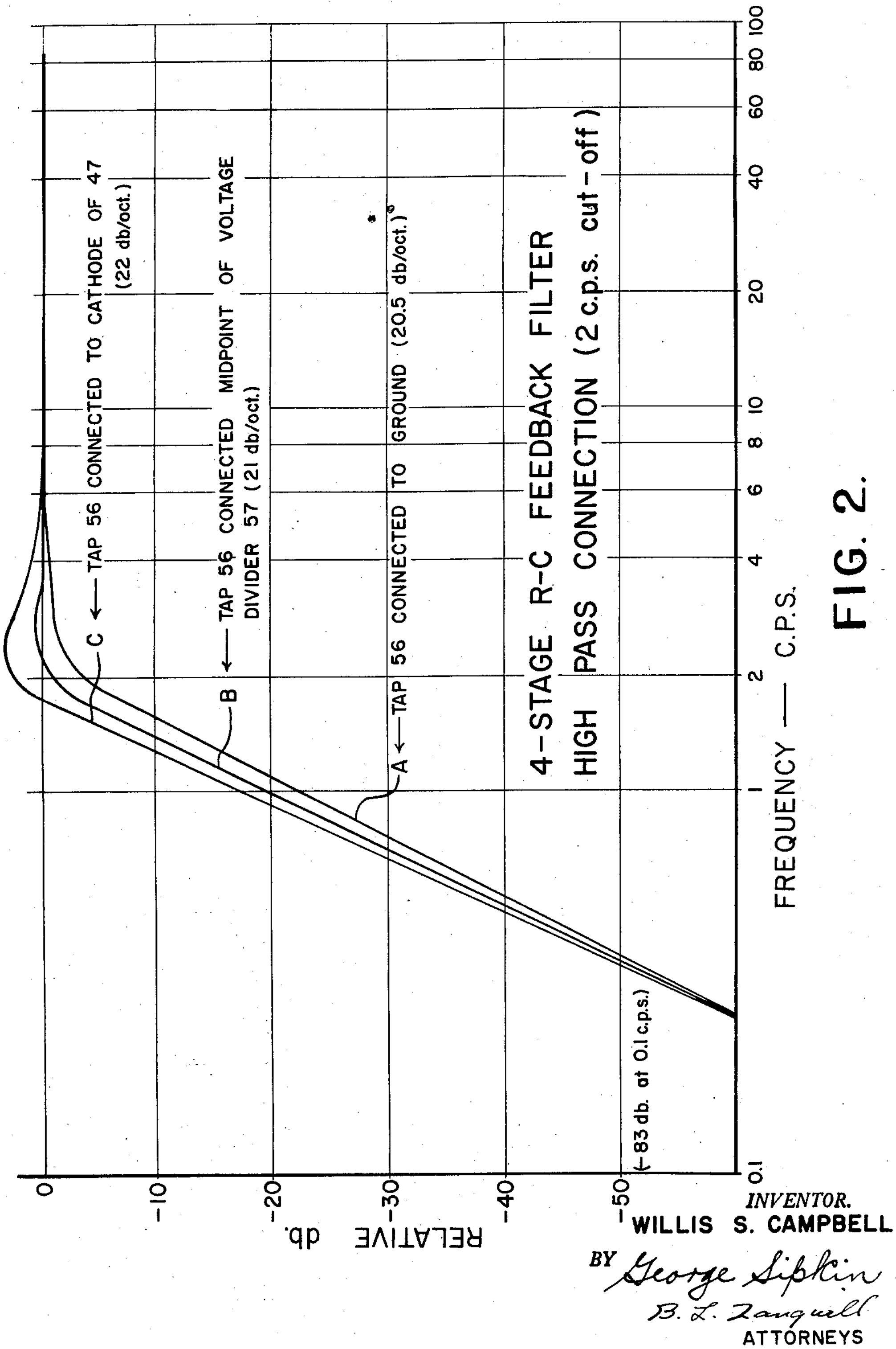
Fig. 2 is a response curve showing the performance of the embodiment of the invention shown in Fig. 1.

The response curves of the circuit using the above circuit constants are shown in Fig. 2 of the drawings. These curves show also the effect of the variable tap 56 on the cathode resistor 57 of the third cathode follower tube 47. Curve A shows the response of the circuit of Fig. 1 with the final cathode follower stage adjusted for minimum gain with adjustable tap 56 at the ground end of cathode resistor 57. Curve B illustrates the overall response of the system with slider 56 at the mid-point and the cathode follower stage including tube 47 operating at a higher gain than in the case of curve A. Curve C shows the response curve of the system with the final cathode follower stage operating at maximum gain, i. e., with slider 56 at the cathode end of resistor 57.

Two effects will be noted in the response curves. The first effect is a change in slope of the response curve below the cut-off frequency. The slope changes from 20.5 db per octave in the case of curve A, to 22 db per octave in the case of curve C. The second effect is a change in the damping of the filter circuit varying from a highly damped circuit in the case of curve A to a lesser amount of damping in the case of curve C. The slider 56 is primarily used as a control for the relative amount of damping of the filter circuit.

The above described high-pass filter requires no definite termination and can operate directly into an infinite impedance such as the grid circuit of a following amplifier stage. An insertion loss of approximately 2 db is suffered for each four-section R-C filter of the type shown in Fig. 1.

Figure 3:
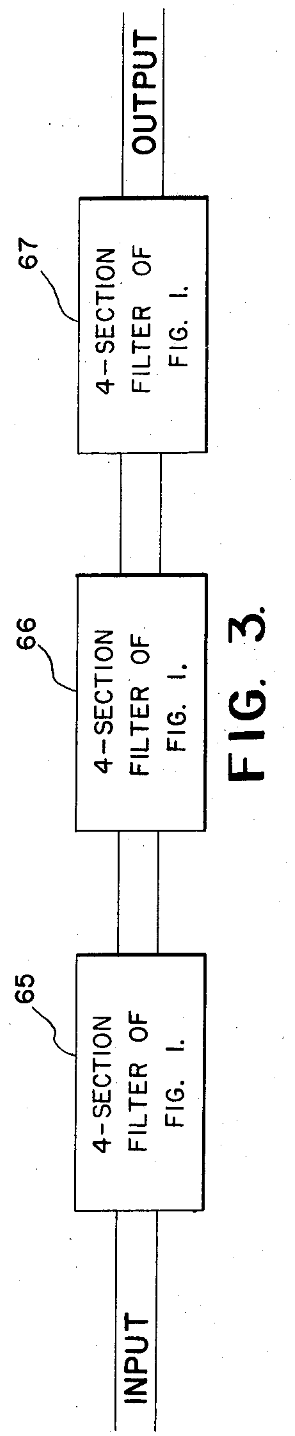
Fig. 3 is a block diagram illustrating another embodiment of the invention.

The slope of the cut-off characteristic curves of Fig. 2 may be made much steeper by cascading a plurality of four section filters of the type shown in Fig. 1, i. e., connecting them in series. An arrangement of this type is shown in block diagram form in Fig. 3. Three filters of the type shown in Fig. 1 represented by blocks 65, 66 and 67 are connected in series between an input source and an output line. Any desired number of such filters may be used depending upon the steepness of the cut-off characteristic desired.

Figure 4:
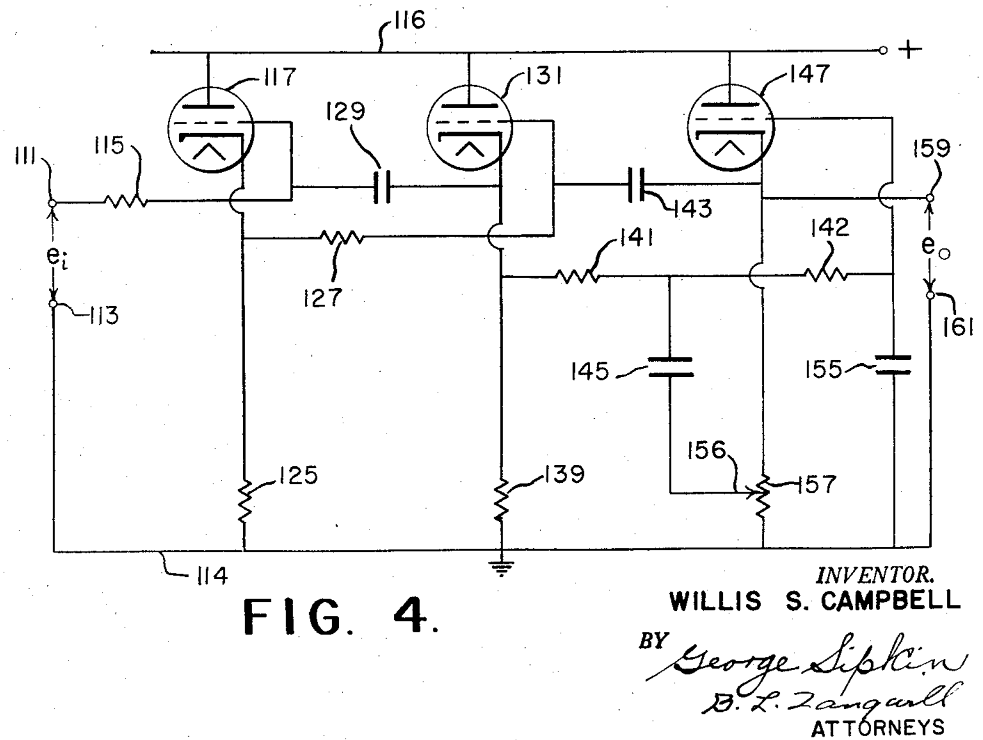
Fig. 4 is a schematic drawing of still another embodiment of the invention.

The principle of the invention applies equally well to low-pass filters. A low-pass filter of this type is shown in Fig. 4 of the drawings. The relative positions of the elements of the four R-C circuits of this modification are reversed from the connection used in Fig. 1 with a consequent reversal of the frequency responsive effect of the system. At low frequencies practically all the input voltage appears as voltage drop across condenser 129 with a much smaller voltage existing across resistor 115. As the frequency is increased a point is reached where the voltage across the condenser 129 becomes very small. Similar relationships applying throughout the system and a low-pass filter cutting off at a frequency determined by the time constant of the R-C circuits used results. The cut-off may be chosen as before by a choice of circuit values.

A low-pass filter circuit having a cut-off frequency of two cycles per second may be set up using the following circuit elements in the circuit of Fig. 4:

| | | |
|---|---|---|
| Tubes: | | |
| 117 | | 1/2-6SN7 |
| 131 | | 1/2-6SN7 |
| 147 | | 1/2-6SN7 |
| Condensers: | | |
| 129 | | 0.5 micro-farads |
| 143 | | 0.5 micro-farads |
| 145 | | 0.5 micro-farads |
| 155 | | 0.5 micro-farads |
| Resistors: | | |
| 115 | | 200,000 ohms |
| 127 | | 200,000 ohms |
| 141 | | 200,000 ohms |
| 143 | | 200,000 ohms |
| 125 | | 10,00 ohms |
| 139 | | 10,00 ohms |
| 157 | | 10,00 ohms |
| High voltage source | | 200 volts |

With the exception of the reversed frequency response relationship of the R-C circuits due to their reversal of parts the operation of the circuit of Fig. 4 is the same as that described for Fig. 1 above. The response curves obtained by use of the circuit of Fig. 4 will be similar in shape to those of Fig. 2 but will be reversed. Output of the filter will remain high up to the frequency where the filter is designed to cut off. The drop in output with further increases in frequency will follow the same general form that a drop in frequency below cut-off produces in the system of Fig. 1.

Figure 5:
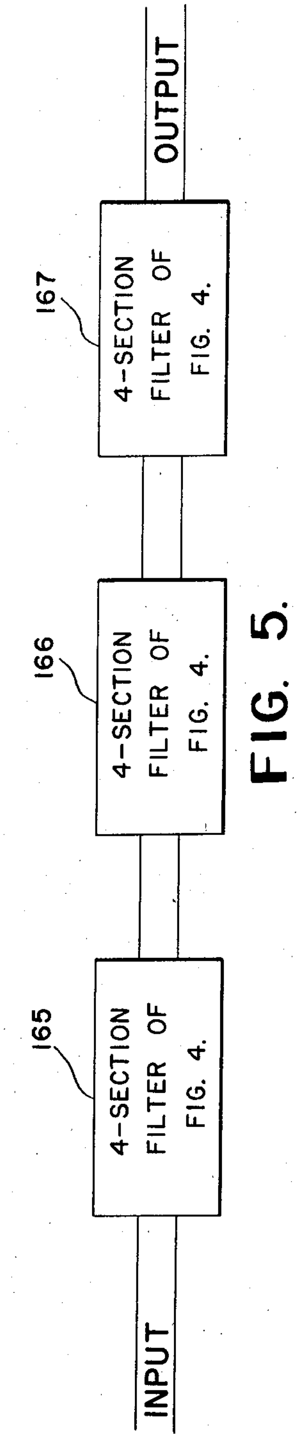
Fig. 5 is a block diagram illustrating a further embodiment of the invention.

Low-pass filters of the type shown in Fig. 4 may be cascaded to produce steeper cut-off characteristics. Such an arrangement is shown in Fig. 5 wherein a plurality of filter circuits 165, 166 and 167 are connected in cascade between an input source and an output line. All the filters represented by the blocks 165, 166 and 167 are of the type shown in Fig. 4.

Figure 6:
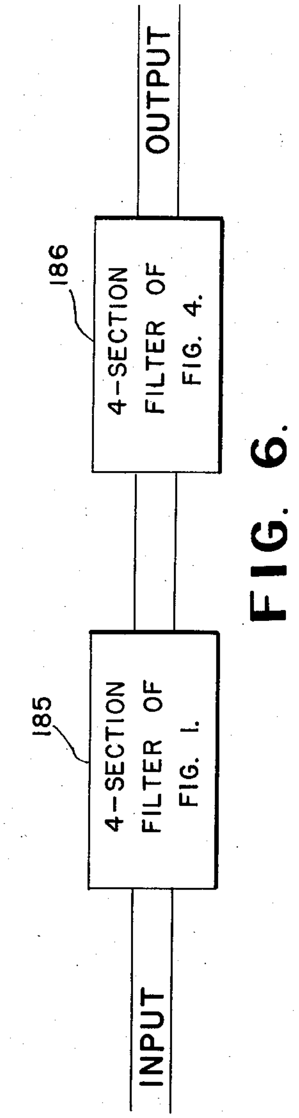
Fig. 6 is a block diagram illustrating still another circuit constructed in accordance with the principles of the invention.

A band-pass filter may be assembled using the circuits of Figs. 1 and 4. Such an arrangement is shown in Fig. 6. A high-pass circuit of the type used in Fig. 1 is represented by block 185. A low-pass circuit of the type shown in Fig. 4 is represented by block 186. When connected in cascade between an input source and an output line as shown in Fig. 6 the overall arrangement constitutes a filter effective to pass the frequencies between the cut-off points of the two filters. For example, filter 185 may be a high-pass filter with a cut-off frequency of 2 cycles per second and filter 186 a low pass filter having a cut-off frequency of 10 cycles per second. The overall system becomes a band-pass filter for signals between 2 and 10 cycles per second, discriminating against all other frequencies. Similar filters may be cascaded as taught in Figs. 3 and 5 to secure the desired slope of cut-off characteristics in the band-pass arrangement of Fig. 6.

It will be readily apparent from the foregoing description of apparatus that highly desirable and useful electrical filters may be constructed in accordance with the principles of the present invention. The apparatus involved is relatively simple and inexpensive and the results are far superior to prior art systems developed for the same purpose. Very low frequency signal voltages may be filtered with systems built around normal electrical components and the design of a filter for a specific purpose is simplified.

Obviously many modifications and variations of the present invention are possible in the light of the above teachings. It is therefore to be understood that within the scope of the appended claims the invention may be practiced otherwise than as specifically described.

What is claimed is:

1. A circuit comprising a plurality of frequency responsive resistance-capacitance circuits each having a series connected resistance element and a condenser element, means adapted to connect a first of said frequency responsive circuits across a source of alternating current, a first cathode follower circuit having its grid circuit connected to the condenser element of said first frequency responsive circuit, means coupling a second one of said frequency responsive circuits to the output of said first cathode follower circuit, a second cathode follower circuit having its grid circuit connected to the condenser element of the second one of said frequency responsive circuits, and positive feed back means coupling the output of said second cathode follower circuit directly to the grid circuit of said first cathode follower circuit.

2. A frequency responsive filter circuit which comprises a plurality of cathode follower isolation circuits, an input circuit for a first cathode follower circuit comprising a first frequency responsive circuit including the cathode resistor of an intermediate cathode follower circuit, an input circuit for said intermediate cathode follower circuit connected to the cathode resistor of said first cathode follower circuit and comprising a second frequency responsive circuit including the cathode resistor of a final cathode follower circuit, and an input circuit for said final cathode follower circuit coupled to the cathode resistor of said intermediate cathode follower circuit comprising a third frequency responsive circuit including at least a portion of the cathode resistor of said final cathode follower circuit.

3. A frequency responsive filter circuit according to claim 2 wherein the portion of the cathode resistor of the final cathode follower circuit included in the input circuit is adjustable whereby the filter characteristic in the region of cut-off may be damped.

4. A frequency responsive filter circuit comprising a plurality of cathode follower isolation circuits, an input circuit for a first cathode follower circuit comprising a first frequency responsive circuit including at least a portion of an intermediate cathode follower circuit, an input circuit connected to the cathode resistor of said first cathode follower circuit comprising a second frequency responsive circuit including the cathode resistor of a final cathode follower circuit, and an input circuit for said final cathode follower circuit connected between the cathode of said intermediate cathode follower circuit and a tap on the cathode resistor of said final cathode follower circuit and including a third frequency responsive circuit.

5. A frequency responsive filter circuit according to claim 4 wherein said tap on the cathode resistor of the final cathode follower circuit is adjustable.

6. A frequency responsive filter circuit according to claim 4 wherein said input circuit for said final cathode follower circuit includes a fourth frequency responsive circuit connected between the third frequency responsive circuit and the grid of the final cathode follower circuit.

7. A frequency responsive circuit comprising a plurality of similar resistance-capacitance filter circuits, a plurality of cathode follower circuits, said resistance-capacitance circuits connected in alternate isolated relationship with said plurality of cathode follower circuits, each adjacent resistance-capacitance filter circuit and cathode follower circuit having a common impedance, and positive feedback means connected between said cathode follower circuits and adapted to modify the time constant of said resistance-capacitance filter circuits by modifying said impedances.

8. A frequency responsive filter circuit as defined in claim 2 but further characterized by said frequency responsive circuits being resistance-capacitance circuits.

9. A frequency responsive filter circuit as defined in claim 8 but further characterized by said frequency responsive circuits being resistance-capacitance circuits, said resistance-capacitance circuits having corresponding circuit elements of substantially the same impedance values.

10. A frequency responsive filter circuit as defined in claim 4 but further characterized by said frequency responsive circuits being resistance-capacitance circuits.

11. A frequency responsive filter circuit as defined in claim 10 but further characterized by said frequency responsive circuits being resistance-capacitance circuits, said resistance-capacitance circuits having corresponding circuit elements of substantially the same impedance values.

References Cited in the file of this patent

UNITED STATES PATENTS

| | | |
|---|---|---|
| 1,943,986 | Nyman | Jan. 16, 1934 |
| 2,198,464 | Shepard | Apr. 23, 1940 |
| 2,386,892 | Hadfield | Oct. 16, 1945 |
| 2,431,973 | White | Dec. 2, 1947 |
| 2,433,378 | Levy | Dec. 30, 1947 |
| 2,519,029 | Dome | Aug. 15, 1950 |
| 2,523,240 | Vackar | Sept. 19, 1950 |
| 2,586,167 | Kamm | Feb. 19, 1952 |
| 2,605,358 | Neher | July 29, 1952 |
| 2,668,238 | Frink | Feb. 2, 1954 |
| 2,672,529 | Villard | Mar. 16, 1954 |
| 2,691,106 | Woodbury | Oct. 5, 1954 |
| 2,732,440 | Newman | Jan. 24, 1956 |
| 2,743,325 | Kaiser et al. | Apr. 24, 1956 |